March 1, 1966 — B. SUNNERS ETAL — 3,238,062

PHOTOCONDUCTOR PREPARATION

Filed April 20, 1962

INVENTORS
BRIAN SUNNERS
ARTHUR H. MONES
GUIDO GALLI

BY George O. Saile
ATTORNEY

United States Patent Office 3,238,062

Patented Mar. 1, 1966

3,238,062

PHOTOCONDUCTOR PREPARATION

Brian Sunners and Arthur H. Mones, Poughkeepsie, N.Y., and Guido Galli, Temple City, Calif., assignors to International Business Machines Corporation, New York, N.Y., a corporation of New York Filed Apr. 20, 1962, Ser. No. 189,192
11 Claims. (Cl. 117—201)

This invention relates to sintered photoconductors which are particularly useful as elements in high speed photologic devices. The invention is more particularly directed to a method for preparing stable sintered photoconductors which are capable of switching over large impedance changes at millisecond intervals.

A photoconductor element or cell is one which has the property of conducting an electric current when light is applied to the element. In an absence of light it is desired that the conductivity of the element be very low. The dark current resistivity of the photoconductor element must therefore be very high. When light is applied to the element a high uniform current flow should begin to flow within milliseconds after application. In turn, when the light is removed, current should stop flowing within milliseconds.

A photologic device may be defined as a device having the property of producing an electrical change of condition upon stimulation of a change in light or other radiant energy condition or vice versa. A photoconductor element may be used in conjunction with, for example, a neon light source, an electroluminescent source or their equivalent to form a photologic device. Photologic devices must be able to change their electrical conditions in milliseconds, therefore, its elements must likewise have this property.

Cadmium sulfide and cadmium selenide are well known photoconductive materials. They have been used in preparing polycrystalline layer photoconductors by addition of suitable flux and doping agents, and sintering the mixture at an elevated temperature. The photoconductor product of this prior art procedure makes acceptable photoconductor elements for general use. However, the prior art photoconductor element is wholly inadequate for use as an element of a photologic device because of its relatively slow response characteristics.

The high response and sensitivity properties of cadmium sulfide and cadmium selenide photoconductor elements may be greatly improved by use of high levels of electron acceptors, such as copper and silver. However, the presence of these elements in the sintered product causes the photoconductor element to be unstable to light and temperature over given periods of time.

An object of this invention is to provide a high speed switching photoconductor having improved light and temperature stability.

Another object of this invention is to provide a high speed switching photoconductor that may be utilized as an element of a photologic device.

A further object of this invention is to provide a method for producing polycrystalline layers of photoconductors capable of switching over large impedance changes at millisecond intervals and which have improved light and temperature stability.

These and other objects are accomplished in accordance with the broad aspects of the present invention by preparing the photoconductor material in the form of a paste, to which is added certain carefully controlled electrically active impurities and a chemical flux. The electrical impurities fall into two groups according to the nature of the impurity level they introduce in energy band gap. Those producing levels lying close to the conduction band are considered to be electron donors and those creating levels close to the valance band are considered to be electron acceptors. Donor elements are selected from the third and seventh columns of the periodic table. Useful acceptor elements are copper and silver. By adding a slight excess of acceptors over donors, the photoconductor will act as an insulator in the dark and a conductor when illuminated with visible light.

The thin layer of paste is applied to an inert substrate in a uniform layer or layers. The coated substrate is then placed in a furnace which has an inert atmosphere and sintered at a high temperature. During this sintering process the large crystals of the photoconductive material grow at the expense of the smaller ones. The crystals grow together and adhere to each other to produce a continuous layer. The sintered photoconductor material is then allowed to cool to room temperature. The photoconductor is post-treated in an inert fluid containing either sulfur or selenium at a temperature of approximately 180–220° C. for a predetermined time.

The foregoing and other objects, features and advantages of the invention will be apparent from the following more particular description of the preferred embodiments of the invention, as illustrated in the accompanying drawings.

Figure 1:
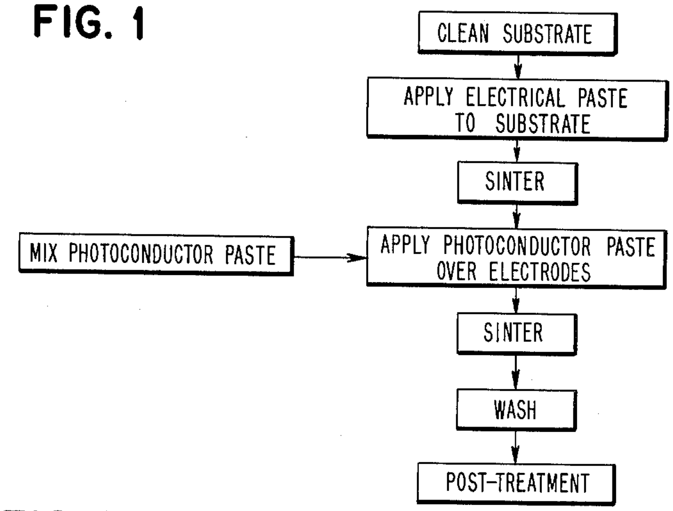
FIGURE 1 is a flow chart illustrating the steps of the novel process.

Referring now, more particularly to FIGURE 1, a suitable substrate for the application of a polycrystalline photoconductor is thoroughly cleaned. A suitable substrate must have the properties of mechanical strength, high electrical insulation, high thermo-conductivity and good mechanical bonding to the photoconductor material. Substrates which have these properties include aluminum, a high percentage aluminum oxide ceramic, anodized aluminum and high purity chemical and thermally resistance glasses. Washing of the substrate may be accomplished by heating the substrate in hot distilled water containing a detergent and agitating the liquid ultrasonically. The substrate is then thoroughly rinsed in hot distilled water and dried.

The electrode connections to the sintered photoconductor layers may be applied either over the sintered photocell by, for example, a painting procedure or by applying the electrodes to the substrate, then covering the electrodes with the photoconductor material and sintering the photoconductor material. It is preferred that the electrodes be applied prior to application of the photoconductor paste to the substrate. Using this alternative, an appropriate electrode paste, for example, a 35% platinum paste, may be applied by silk-screening onto the substrate in the desired geometry. The paste is then fired at a high temperature in a furnace, cooled, rinsed in hot water and dried.

An example of the photoconductor paste formulation follows:

| | | |
|---|---|---|
| Cadmium sulfide or cadmium selenide | grams | 60.00 |
| Cadmium chloride | do | 6.40 |
| Glycerine | do | 28.80 |

Copper chloride in aqueous solution—Copper concentration 2570 atom p.p.m. of cadmium sulfide or cadmium selenide.

The ingredients are intimately mixed and applied to the substrate in the desired geometry by any conventional application procedure such as spraying, brushing or silk-screening.

The proportions of the additives cadmium chloride and copper chloride may be varied. The percentage of cadmium chloride in the paste may be varied from 7% to upwards of 20% by weight. Below the 7% level the sintered paste has poor mechanical properties and above the 20% level, sensitivity of the photoconductor is decreased due to what is believed to be the formation of pin holes in the photoconductor layer as the cadmium chloride evaporates. High acceptor concentration in the form of copper or silver ion in the photoconductor paste produces a polycrystalline photoconductor after sintering having a very high dark resistance. It has been found that the higher the acceptor concentration, the higher is the sensitivity and switching speed of the polycrystalline photoconductor layer.

The photoconductor paste coated substrate is then placed in a furnace having a temperature of upwards of 500° C. The atmosphere in the furnace must be inert and is preferably a wet nitrogen atmosphere. The photoconductor paste is sintered in the furnace and the resultant photoconductor layer is continuous and polycrystalline. After cooling, the photoconductor is soaked in warm distilled water for a period of time to remove any remaining cadmium chloride flux.

The post-treatment of the photoconductor layer may take one of two forms, treatment in a vapor phase or in a liquid phase. The active treating material is either sulfur or selenium. In each form there is required an inert media in which the active treating material is present and that the temperature during the time of treatment be maintained between approximately 180 and 220° C.

The photoconductor in the vapor phase form of post-treatment is dipped in a saturated solution of sulfur in carbon bisulfide and then dried. It is then placed in a vacuum oven and brought to a temperature of 180–220° C. while maintaining the pressure at approximately 100 microns. The photoconductor is maintained at this temperature for approximately 25 minutes and then the power is cut off to the oven. The vacuum pump is turned off and the photoconductor removed from the oven when the temperature reaches 100° C. or lower.

The liquid phase post-treatment system has the active treating agent, sulfur or selenium, suspended or dissolved in a high boiling inert liquid such as ethylene glycol or glycerine. Approximately 0.5% by weight of sulfur or selenium is dissolved or maintained in fine suspension in the inert liquid. Solubility of the selenium is increased by the addition of a base such as sodium carbonate or sodium hydroxide to the system. The photoconductor to be post-treated is placed in the prepared liquid and the liquid is heated to approximately 180–220° C. and maintained at this temperature for approximately 30 minutes. Where ethylene glycol is used as the inert liquid media, it is brought to its boiling point of 197° C. and simply boiled at that temperature for the required post-treating time. The photoconductor is removed from the liquid when the system has cooled to 60° C. or lower and washed thoroughly in distilled water and dried.

Figure 2:
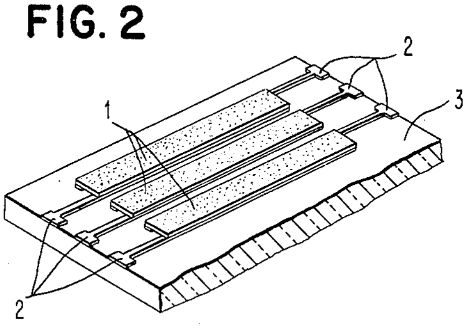
FIGURE 2 is a plane view of the completed photoconductor device.

FIGURE 2 illustrates one form which the photoconductor device might take. Three photoconductor elements or cells in the form of layers 1 are located over conducting lines 2. The conducting lines are deposited in an appropriate geometry over a nonconducting substrate 3. Over the surfaces of the photoconductor layers 1 is a protective coating (not shown).

Figure 3:
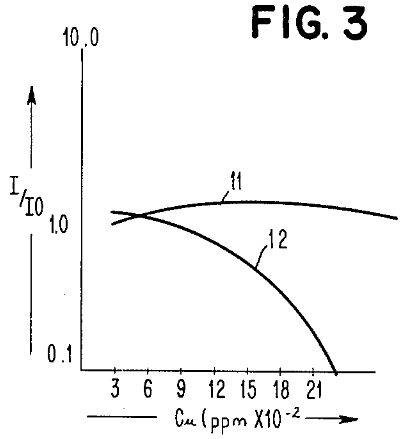
FIGURE 3 is a graphical presentation of room temperature aging of sulfur vapor post-treated photoconductors with variation in copper concentration.
Figure 5:
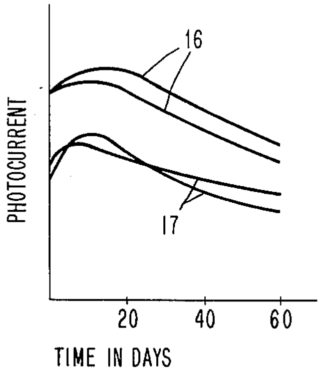
FIGURES 4 and 5 are graphical representations comparing the aging of sulfur vapor phase post-treated, selenium liquid phase post-treated and unpost-treated photoconductors.
Figure 4:
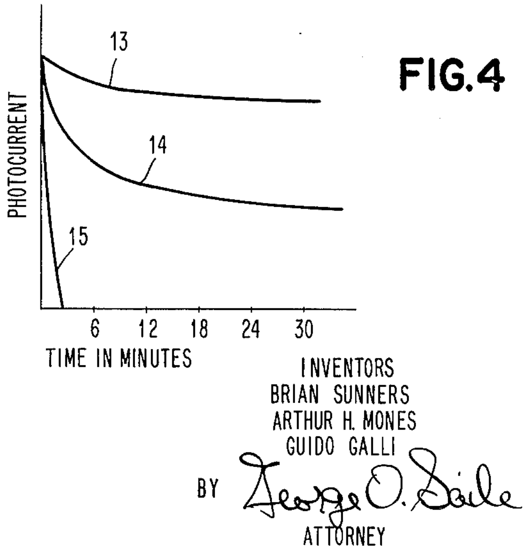

FIGURES 3, 4, and 5 show typical results obtained from the aging of a cadmium selenide photoconductor that has been post-treated in comparison to an untreated cadmium selenide photoconductor. The curve 11 of FIGURE 3 shows that the ratio of the present photocurrent to the initial photocurrent remains at approximately 1 regardless of copper concentration where the photoconductor has been post-treated. This particular sample was post-treated in sulfur vapor media and the aging was done at room temperature for a period of 150 days. Curve 12 illustrates the rapid deterioration of the ratio of present current to initial photocurrent on the unpost-treated photoconductor sample.

FIGURE 4 compares the effectiveness of the selenium liquid phase post-treated, the sulfur vapor phase post-treated and unpost-treated photoconductors under the severe aging conditions. The photoconductor samples were subjected to a flashing neon light with an 83 percent duty cycle (the light is on 83 percent and off 17 percent of the time) while maintained at 55° C. The selenium liquid phase post-treatment, curve 13, responded very well and the photocurrent was reduced only slightly. The sulfur vapor phase post-treatment, curve 14, responded almost as well as the selenium liquid phase treatment. The rapid deterioration of the unpost-treated photoconductor is shown in curve 15 wherein the photocurrent is reduced to a low value quite rapidly as compared to the post-treated photoconductors.

FIGURE 5 illustrates longer aging of selenium liquid phase post-treated and sulfur vapor phase post-treated photoconductors. These photoconductors were aged at a temperature 105° C. in the dark. The selenium liquid phase, curves 16, and the sulfur vapor phase, curves 17, post-treated photoconductors performed well under the aging test. The unpost-treated photoconductors deteriorated so rapidly under this test that they cannot be shown on the figure separate from the vertical graph line.

The photoconductors are then preferably encapsulated in a resin or glass protective layer. The application of the protective coating material may be by any conventional technique such as silk-screening, brushing or spraying.

The invention thus provides a method for producing photoconductors capable of high speed switching. The procedure produces a product which is light and temperature stable even under somewhat severe conditions. The photoconductor element of the invention may be used in conjunction with, for example, a neon light source, an electroluminescent source or their equivalent to form a photologic device. Furthermore, the method is suitable for automatic production and will permit fabrication of large numbers of these devices at a low cost.

While the invention has been particularly shown and described with reference to the preferred embodiments thereof, it will be understood by those skilled in the art that various changes in form and details may be made therein without departing from the spirit and scope of the invention.

What is claimed is:

1. A method of forming a photoconductive layer having superior temperature and light stability characteristics comprising:

coating a substrate with a material consisting essentially of at least one compound from the group consisting of cadmium sulfide and cadmium selenide, and including minor portions of a donor element selected from the group consisting of elements from the third and seventh columns of the periodic table and an acceptor element selected from the group consisting of silver and copper, said donor element being in sufficient quantity to act as a chemical flux;

sintering the supported coating in an inert atmosphere to thereby form a substantially continuous polycrystalline photoconductor layer;

and heating the coating in an inert fluid containing an element from the group consisting of sulfur and selenium at a temperature of approximately 180°–220° C. for a predetermined time to increase the stability of said coating.

2. A method of forming a photoconductive layer having superior temperature and light stability characteristics comprising:

coating a substrate with a material consisting essentially of at least one compound from the group consisting of cadmium sulfide and cadmium selenide, a cadmium chloride, and including minor portions of an acceptor element selected from the group consisting of silver and copper;

said acceptor element being present in concentration of greater than 900 atom parts per million molecules cadmium selenide;

said cadmium chloride being present in concentration of about 7% to 20% by weight of said material;

sintering the supported coating in an inert atmosphere to thereby form a substantially continuous polycrystalline photoconductor layer;

and heating the coating in an inert fluid containing an element from the group consisting of sulfur and selenium at a temperature of approximately 180°–220° C. for a predetermined time to increase the stability of said coating.

3. A method of forming a photoconductive layer having superior temperature and light stability characteristics comprising:

coating a substrate with a photoconductor material consisting essentially of at least one compound from the group consisting of cadmium sulfide and cadmium selenide, a cadmium chloride in sufficient concentration to be able to act as a chemical flux and including minor portions of copper;

sintering the supported coating in an inert atmosphere to thereby form a substantially continuous polycrystalline photoconductor layer;

and heating the coating in an inert liquid containing an element from the group consisting of sulfur and selenium at a temperature of approximately 180°–220° C. for a predetermined time to increase the stability of said coating.

4. A method of forming a photoconductive layer having superior temperature and light stability characteristics comprising:

coating a substrate with a photoconductor material consisting essentially of cadmium selenide, cadmium chloride and including minor portions of an acceptor element selected from the group consisting of silver and copper;

said acceptor being present in concentration of greater than 900 atom parts per million molecules cadmium selenide;

said cadmium chloride being present in concentration of about 7% to 20% by weight of said material;

sintering the supported coating in an inert atmosphere to thereby form a substantially continuous polycrystalline photoconductor layer;

and heating the coating in an inert liquid containing selenium at a temperature of approximately 180°–220° C. for a predetermined time to increase the stability of said coating.

5. A method of forming a photoconductive layer having superior temperature and light stability characteristics comprising:

coating a substrate with a photoconductor material consisting essentially of cadmium sulfide, cadmium chloride in sufficient concentration to be able to act as a chemical flux and including minor portions of copper of greater than 900 atom parts per million cadmium sulfide concentration;

sintering the supported coating in an inert atmosphere to thereby form a substantially continuous polycrystalline photoconductor layer;

and heating the coating in an inert liquid containing sulfur in solution at a temperature of approximately 180°–220° C. for a predetermined time to increase the stability of said coating.

6. A method of forming a photoconductive layer having superior temperature and light stability characteristics comprising:

coating the substrate with a photoconductor material consisting essentially of cadmium selenide, cadmium chloride in sufficient concentration to be able to act as a chemical flux and including minor portions of copper of greater than 900 atom parts per million cadmium selenide concentration;

sintering the supported coating in nitrogen atmosphere to thereby form a substantially continuous polycrystalline photoconductor layer;

and heating the coating in sulfur in ethylene glycol solution at approximately 180°–200° C. for a predetermined time to increase the stability of said coating.

7. A method of forming a photoconductive layer having superior temperature and light stability characteristics comprising:

coating a substrate with a material consisting essentially of cadmium selenide and including minor portions of a donor element selected from the group consisting of elements from the third and seventh columns of the periodic table and an acceptor element selected from the group consisting of silver and copper;

said donor element being in sufficient quantity to act as a chemical flux;

said acceptor being present in concentration of greater than 900 atom parts per million molecules cadmium selenide;

sintering the supported coating in a nitrogen atmosphere to thereby form a substantially continuous polycrystalline photoconductor layer;

and heating the coating in a container containing solely sulfur vapor at a temperature of approximately 180°–220° C. for a predetermined time to increase the stability of said coating.

8. A method of forming a photoconductive layer having superior temperature and light stability characteristics comprising:

coating a substrate with a material consisting essentially of cadmium sulfide, cadmium chloride and including minor portions of an acceptor element selected from the group consisting of silver and copper;

said cadmium chloride being present in concentration of about 7% to 20% by weight of said material;

sintering the supported coating in a nitrogen atmosphere to thereby form a substantially continuous polycrystalline photoconductor layer;

and heating the coating in a selenium in ethylene glycol solution at a temperature of approximately 180°–200° C. for a predetermined time to increase the stability of said coating.

9. A method of forming a photoconductive layer having superior temperature and light stability characteristics comprising:

coating a substrate with a material consisting essentially of cadmium sulfide and including minor portions of cadmium chloride and copper;

said copper being present in concentration of greater than 900 atom parts per million cadmium sulfide;

said cadmium chloride being present in concentration of about 7% to 20% by weight of said material;

sintering the supported coating in a nitrogen atmosphere to thereby form a continuous polycrystalline photoconductor layer;

and heating the coating in a container containing solely sulfur vapor at a temperature of approximately 180°–220° C. for a predetermined time to increase the stability of said coating.

10. A photoconductive layer made by the process of claim 1.

11. A photoconductive layer made by the process of claim 2.

References Cited by the Examiner

UNITED STATES PATENTS

| | | | |
|---|---|---|---|
| 2,699,512 | 1/1955 | Sheldon | 313—65.1 |
| 2,732,469 | 1/1956 | Palmer | 313—65.1 |
| 2,765,385 | 10/1956 | Thomsen | 117—201 |
| 2,833,675 | 5/1958 | Weimer | 117—215 |
| 2,879,182 | 3/1959 | Pakswer et al. | 117—201 |
| 2,908,594 | 10/1959 | Briggs | 117—201 |
| 3,142,586 | 7/1964 | Colman | 117—215 |

OTHER REFERENCES

Bube: Photoconductivity of Solids, John Wiley and Sons, Inc., New York, p. 92 (1960).

JOSEPH B. SPENCER, *Primary Examiner.*

JOSEPH REBOLD, RICHARD D. NEVIUS, *Examiners.*